United States Patent
Kao et al.

(10) Patent No.: US 7,849,314 B2
(45) Date of Patent: Dec. 7, 2010

(54) METHOD AND SYSTEM FOR SECURE AUTHENTICATION IN A WIRELESS NETWORK

(75) Inventors: Min-Chih Kao, Taipei (TW); Ya-Wen Lee, Chiayi (TW); Yi-Shiung Yeh, Hsinchu Ciry (TW); Chen-Hwa Song, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1088 days.

(21) Appl. No.: 11/410,562

(22) Filed: Apr. 24, 2006

(65) Prior Publication Data

US 2007/0162958 A1 Jul. 12, 2007

(30) Foreign Application Priority Data

Dec. 29, 2005 (TW) ................. 94147150 A

(51) Int. Cl.
*H04L 9/00* (2006.01)
*H04L 9/08* (2006.01)
*H04L 29/06* (2006.01)

(52) U.S. Cl. .............. 713/169; 713/168; 380/44; 380/278; 726/4

(58) Field of Classification Search ........ None
See application file for complete search history.

(56) References Cited

U.S. PATENT DOCUMENTS 7,350,076 B1 * 3/2008 Young et al. ............. 713/169

OTHER PUBLICATIONS

Aboba, B. et al. "PPP EAP TLS Authentication Protocol" (RFC2716), Oct. 1999.*

* cited by examiner

*Primary Examiner*—Kaveh Abrishamkar
(74) *Attorney, Agent, or Firm*—J.C. Patents

(57) ABSTRACT

A method and a system for secure authentication in a wireless network are provided. The method comprises the following steps. First, a network device and a client device of a wireless network authenticate each other with EAP-TLS. Wherein, the network device mentioned above is a gateway or an access point. Then, the network device and the client device generate a TLS master secret jointly. In addition, the method uses a distributed mechanism to prevent the consequences of the failure of a single AAA server, and to alleviate the consequences resulting from a violated network device. Furthermore, the method includes a multiple time digital signature mechanism achieved by performing multiple times of one-way hash operation to enable verification and revocation of certificate.

18 Claims, 8 Drawing Sheets

METHOD AND SYSTEM FOR SECURE AUTHENTICATION IN A WIRELESS NETWORK

CROSS-REFERENCE TO RELATED APPLICATION

This application claims the priority benefit of Taiwan application serial no. 94147150, filed on Dec. 29, 2005. All disclosure of the Taiwan application is incorporated herein by reference.

BACKGROUND OF THE INVENTION

1. Field of the Invention

The present invention relates to a method and a system thereof for secure authentication in a wireless network, and more particularly, to a method and a system thereof for secure authentication in a distributed wireless network.

2. Description of the Related Art

The extensible authentication protocol transport layer security (EAP-TLS) is a security protocol widely applied in the wireless network. The configuration of a conventional wireless network is as shown in FIG. 1. The wireless network of FIG. 1 comprises an authentication server (a.k.a. AAA server for authentication, authorization and accounting) 101, a gateway 111, the access points 121 and 122, and the client devices 131~133. The authentication process of the conventional EAP-TLS is as shown in FIG. 2 starting from step 210.

It is assumed that the client device 132 requires the services. First, in step 210, the AAA server 101 and the client device 132 authenticate each other. Then, in step 220, the AAA server 101 and the client device 132 generate a TLS master secret jointly. Then, in step 230, the AAA server 101 transmits the TLS master secret to the access point 121 to generate a wired-equivalence privacy key (WEP key) that is subsequently used to encrypt the communication link between the client device 132 and the access point 121.

The conventional method has a couple of disadvantages. The first disadvantage is, since the AAA server is managed in a centralized manner, if the AAA server fails, the system is not able to provide the services. For example, the new user cannot be successfully authenticated and the on-line user cannot be re-authenticated periodically.

The second disadvantage of the conventional method is, even though the client device and the AAA server can authenticate each other, the present client device cannot successfully query the certificate status of the AAA server, namely it is not possible to query whether the certificate of the AAA server is legitimate and valid or not. The querying step is ignored in the conventional method, thus a security risk is raised and it is hard to deal with the certificate revocation.

The third disadvantage of the conventional method is, since the AAA server usually transmits the TLS master secret to the access point in plain text and the AAA server usually is a remote server, there will be a high risk for transmitting the TLS master secret transmit to the remote network.

SUMMARY OF THE INVENTION

Therefore, it is an object of the present invention to provide a method for secure authentication in a wireless network. The method resolves the problems in the conventional technique such as the client device cannot query the remote site's certificate status and is hard to revoke the certificate.

It is another object of the present invention to provide a system for secure authentication in a wireless network. The system prevents the consequences of the failure of a single AAA server and reduces the risk of transmitting the TLS master secret in plain text.

In order to achieve the objects mentioned above and others, the present invention provides a modified method for secure authentication in a wireless network. The modified method comprises the following steps. First, a network device and a client device of a wireless network authenticate each other with EAP-TLS. Wherein, the network device is a gateway or an access point. Then, the network device and the client device generate a TLS master secret jointly.

In an embodiment of the method for secure authentication in the wireless network mentioned above, the wireless network has a plurality of network devices. In addition, the method mentioned above further comprises: using a key-insulated scheme (KIS) to generate a plurality of sub-private keys according to a private key of a key pair; and distributing each sub-private key to one of the network devices for the authentication with EAP-TLS.

In an embodiment of the method for secure authentication in the wireless network mentioned above, the network device is a gateway, and the method further comprises: the network device transmitting the TLS master secret to the access point of the client device.

In an embodiment of the method for secure authentication in the wireless network mentioned above, the network device is an access point.

In an embodiment, the method for secure authentication in the wireless network further comprises the following steps. First, $\{H(r_1), H(r_2), \ldots, H(r_n)\}$, $\{H^2(r_1), H^2(r_2), \ldots, H^2(r_n)\}$, ..., to $\{H^N(r_1), H^N(r_2), \ldots, H^N(r_n)\}$ are calculated according to a set of numbers $\{r_1, r_2, \ldots, r_n\}$ with an asymmetric one-way hash function, wherein n and N are integers. Then, $\{H^N(r_1), H^N(r_2), \ldots, H^N(r_n)\}$ is published, and a set of index values $\{s_1, s_2, \ldots, s_k\}$ is assigned to the network device, wherein $\{s_1, s_2, \ldots, s_k\} \subseteq \{1, 2, \ldots, n\}$. Then, in the beginning of one cycle, $\{H^i(r_{s_1}), H^i(r_{s_2}), \ldots, H^i(r_{s_k})\}$ is used as a multiple time digital signature of the network device, wherein i is an integer smaller than N. After the network device and the client device authenticate each other with EAP-TLS, the client device receives the digital signature of the network device. If $\{H^N(r_{s_1}), H^N(r_{s_2}), \ldots, H^N(r_{s_k})\}$ is obtained after performing (N−i) times of hash operation on the multiple time digital signature with the hash function H, the digital signature is determined as legitimate. Finally, in the beginning of the next cycle, the value of i is decreased by a positive integer, and the digital signature of the network device is updated according to the new value of i.

In an embodiment of the method for secure authentication in the wireless network mentioned above, if the wireless network has multiple network devices, the combination of the index values corresponding to each network device will not be the same.

From another aspect of the present invention, the present invention provides a system for secure authentication in a wireless network. The system comprises a client device and a network device. The network device and the client device authenticate each other with EAP-TLS and generate a TLS master secret jointly after the authentication. Wherein, the network device is a gateway or an access point.

In accordance with a preferred embodiment of the present invention, the method and system for secure authentication in a wireless network mentioned above distribute an authentication mechanism to multiple network devices with the EAP-TLS protocol to prevent the consequences of the failure of a single AAA server. Accordingly, the TLS master secret is only transmitted in local or even not transmitted, which alleviates the risk of transmitting the TLS master key in plain text. Moreover, it is not required to transmit the re-authentication message to the remote authentication sever, which reduces the communication cost on the periodical re-authentications.

Furthermore, a method of performing multiple times of hash function on the multiple time digital signature is applied in the method and system for secure authentication in a wireless network mentioned above, which effectively resolves the problem that the client device is not able to query the certificate status during the authentication. In addition, since the digital signature of the gateway or the access point is changed in each cycle, the system security is improved. Even when the digital signature is embezzled, the embezzled digital signature is invalid in next cycle, which does not impact the legitimacy of other digital signatures. By using the method and system for secure authentication in a wireless network mentioned above, the system administrator can quickly revoke a specific gateway or access point. Moreover, since the hash operation is much faster than the conventional asymmetric signature algorithm, the efficiency of the signature and the verification of the signature are both improved.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

DESCRIPTION PREFERRED EMBODIMENTS

Figure 1:
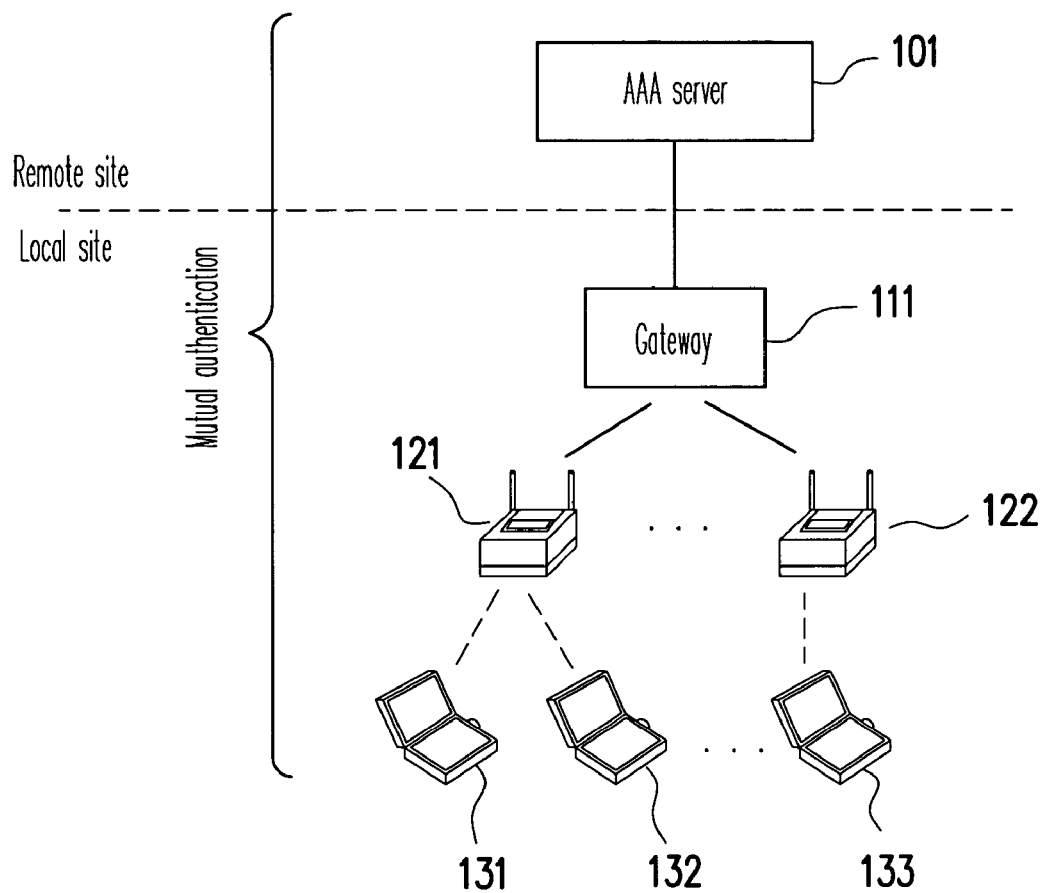
FIG. 1 is a configuration diagram of a conventional wireless network.
Figure 2:
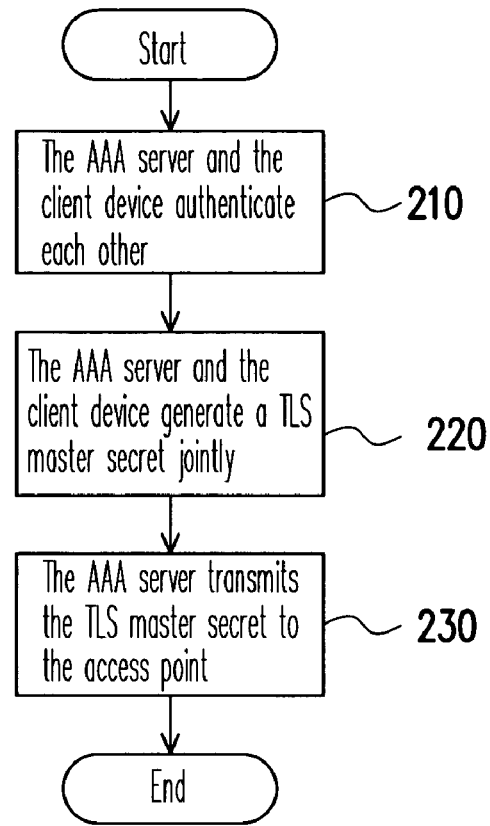
FIG. 2 is a flow chart of a conventional EAP-TLS authentication.
Figure 3:
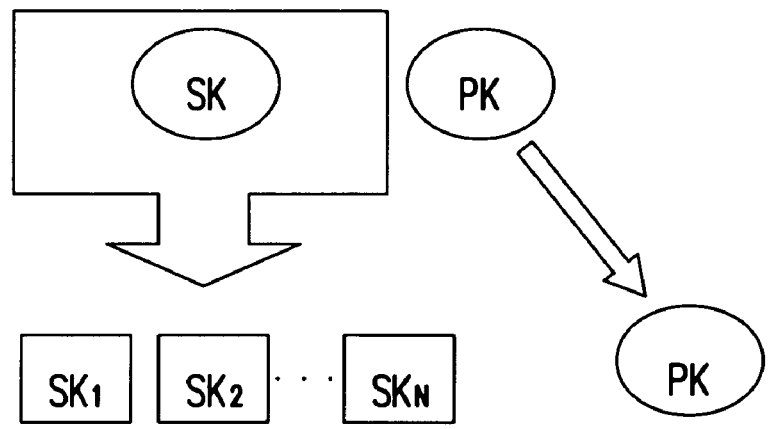
FIG. 3 is a schematic diagram of the KIS technique.

In order to prevent the consequences of the failure of a single AAA server, one of the improvements in the present invention is to distribute the authentication function of the AAA server into multiple gateways or access points in a wireless network. In such case, if all gateways or access points use the same private key for authentication, once the private key is cracked, the whole network system is under risk of attack. In order to distribute the risks and to control the damages, a key-insulated scheme (KIS) is used in the present invention. As shown in FIG. 3, the public key PK in all key pairs for authentication is not changed, and all of the client devices use the same public key PK to authenticate each other with the gateway or the access point. A plurality of sub-private keys $SK_1 \sim SK_N$ is generated from the original private key SK by using the KIS, and each gateway or access point in the wireless network respectively uses one of the sub-private keys $SK_1 \sim SK_N$ to authenticate each other with the client device. Accordingly, even when one sub-private key is cracked, all other gateways or access points are not under risk of attack.

Figure 4:
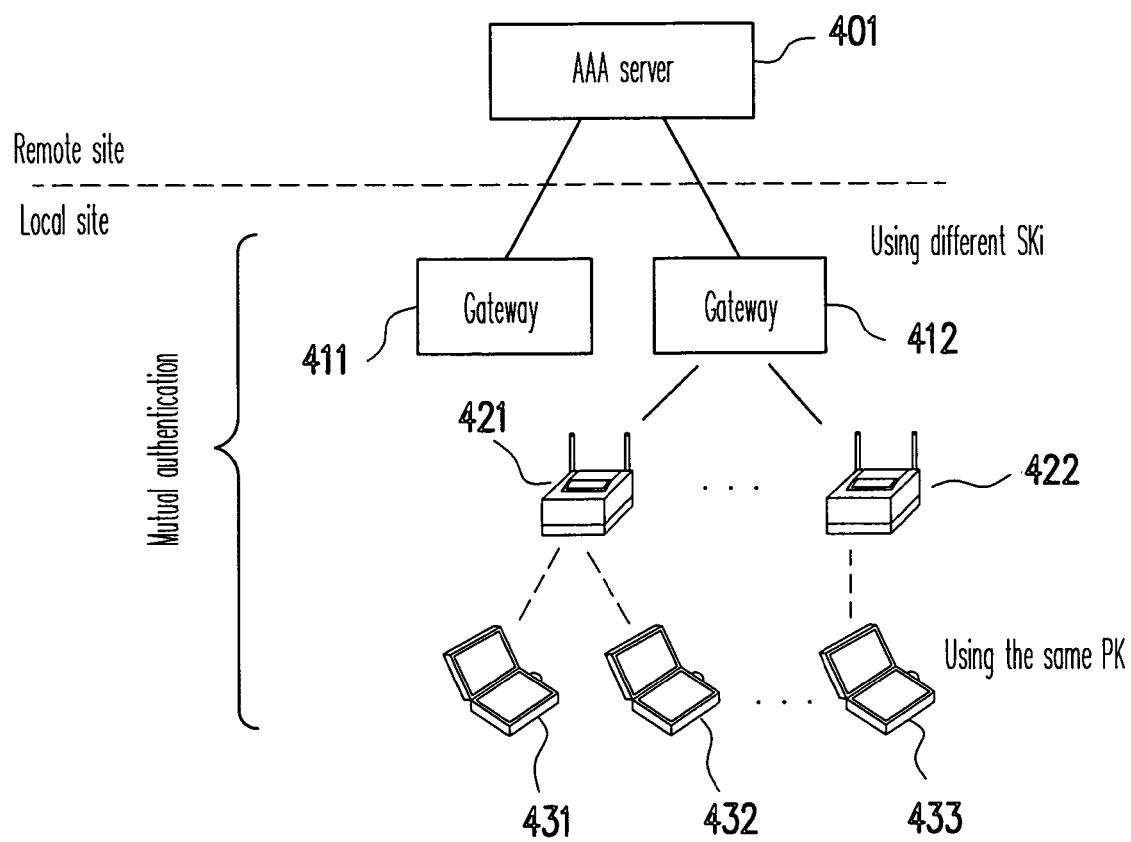
FIG. 4 is a configuration diagram of a wireless network according to the first embodiment of the present invention.
Figure 5:
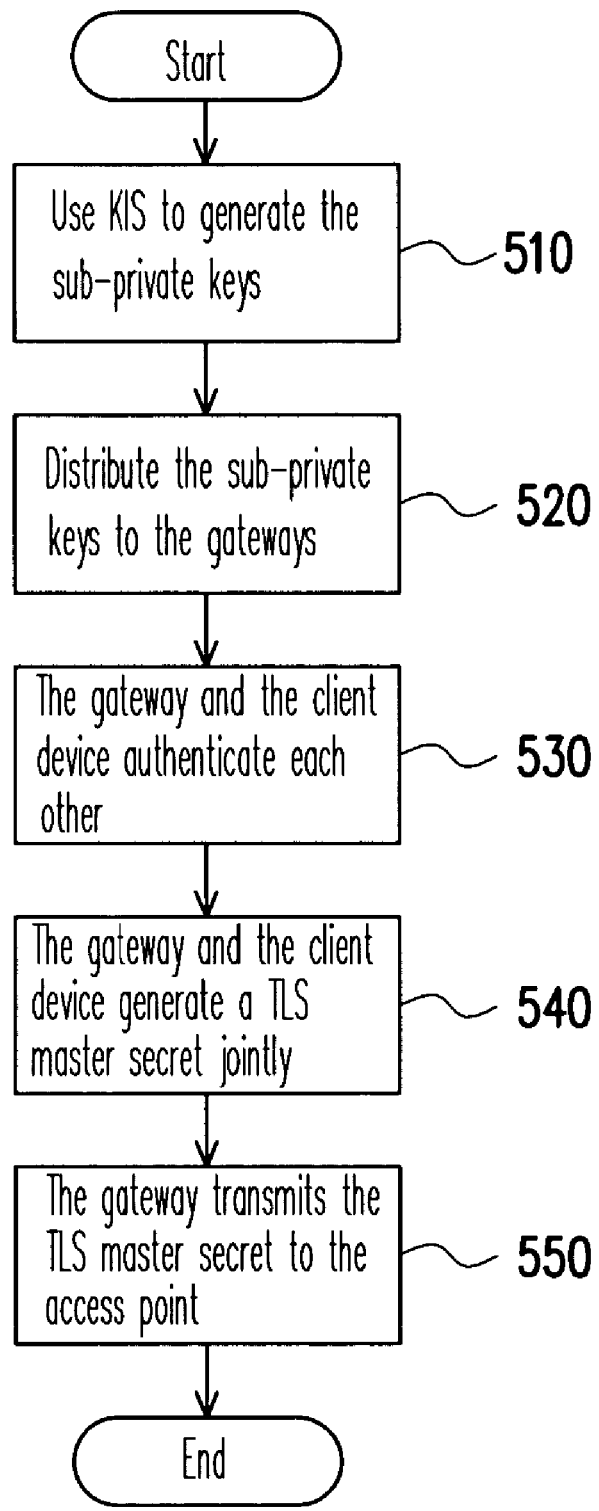
FIG. 5 is a flow chart illustrating a method for secure authentication in a wireless network according to the first embodiment of the present invention.

FIG. 4 is a configuration diagram of a wireless network according to a first embodiment of the present invention. FIG. 5 is a flow chart illustrating a method for secure authentication in a wireless network according to the first embodiment of the present invention. In the present embodiment, the gateways 411~412 are responsible for authentication. First, in step 510, the sub-private keys $SK_1 \sim SK_N$ are generated by using a KIS technique. Then, in step 520, the sub-private keys $SK_1 \sim SK_N$ are distributed to the gateways 411~412. One of the gateways 411~412 and one of the client devices 431~433 authenticate each other with EAP TLS in step 530, and a TLS master secret is commonly generated in step 540. Finally, in step 550, the gateway transmits the TLS master secret to the access point used by the client device. For example, the access point 421 is used by the client devices 431 and 432, and the access point 422 is used by the client device 433. Afterwards, the access point used by the client device generates a WEP key according to the TLS master secret, and the WEP key is subsequently used to encrypt the contents of the communication link.

Figure 6:
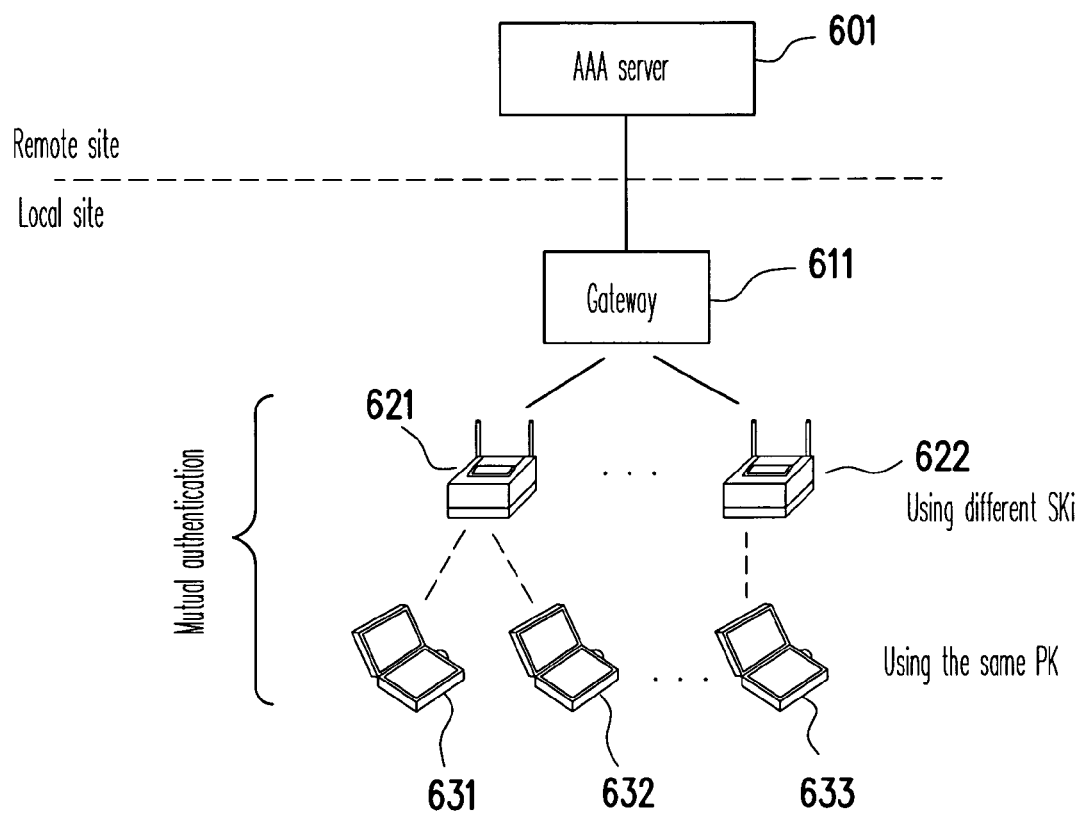
FIG. 6 is a configuration diagram of a wireless network according to the second embodiment of the present invention.
Figure 7:
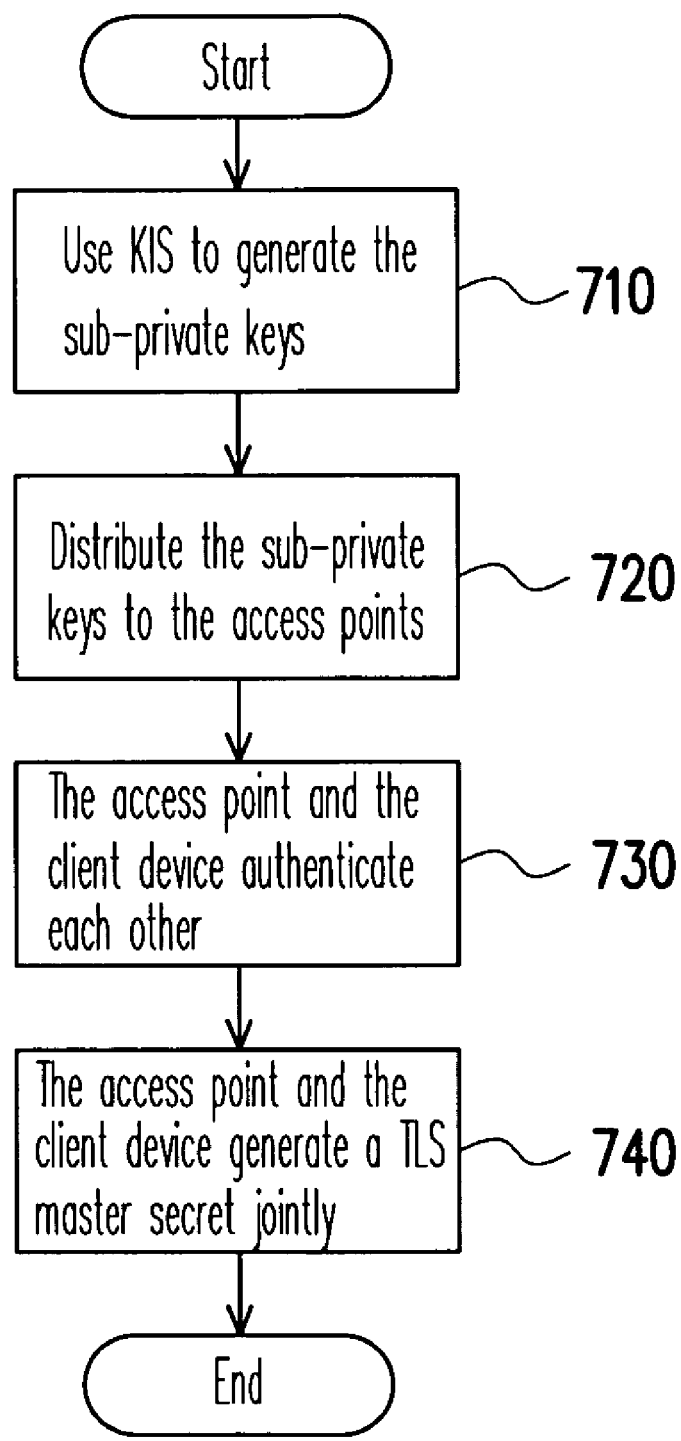
FIG. 7 is a flow chart illustrating a method for secure authentication in a wireless network according to the second embodiment of the present invention.

FIG. 6 is a configuration diagram of a wireless network according to a second embodiment of the present invention. FIG. 7 is a flow chart illustrating a method for secure authentication in a wireless network according to the second embodiment of the present invention. In the present embodiment, the access points 621~622 are responsible for authentication. First, in step 710, the sub-private keys $SK_1 \sim SK_N$ are generated by using the KIS technique. Then, in step 720, the sub-private keys $SK_1 \sim SK_N$ are distributed to the access points 621~622. One of the access points 621~622 and one of the client devices 631~633 authenticate each other with EAP TLS in step 730, and a TLS master secret is commonly generated in step 740. Afterwards, the access point generates a WEP key according to the TLS master secret, and the WEP key is subsequently used to encrypt the contents of the communication link.

In the embodiments mentioned above, the client device still cannot query whether the certificate of the gateway or access point is legitimate or not. In order to resolve this problem, the present invention further comprises a method for multiple time digital signature, which is described in great detail hereinafter.

Figure 8:
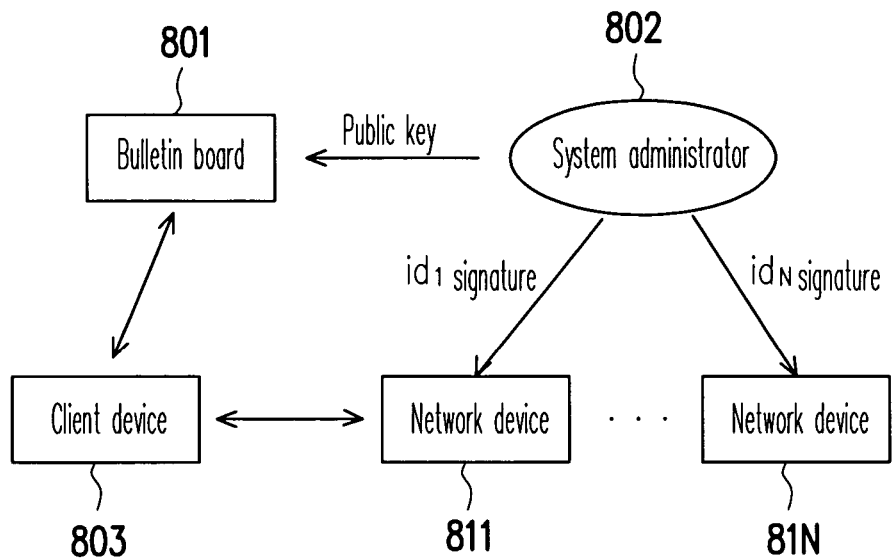
FIG. 8 is a configuration diagram of a wireless network according to the third embodiment of the present invention.

FIG. 8 is a configuration diagram of a wireless network according to a third embodiment of the present invention. In the present embodiment, the system administrator 802 first publishes the public key on a bulletin board 801 and signs the identification (id) code of the network devices 811~81N in the wireless network. Wherein, the network devices 811~81N may be the gateways or the access points. The client device 803 can obtain the public key from the bulletin board 801, and uses the public key to authenticate whether the multiple time digital signature of the network devices 811~81N is legitimate or not. In addition, the digital signature of the network devices 811~81N are updated in the beginning of each cycle. Accordingly, the client device 803 can authenticate the legitimacy of the network devices 811~81N in each cycle.

Figure 9:
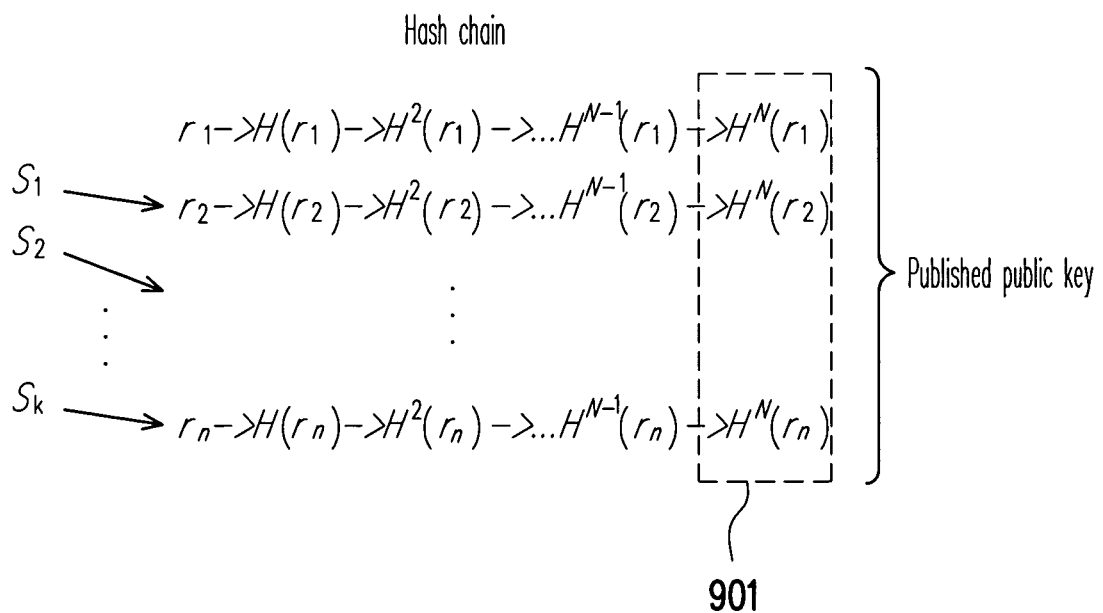
FIG. 9 is a schematic diagram of a hash chain according to the third embodiment of the present invention.
Figure 10:
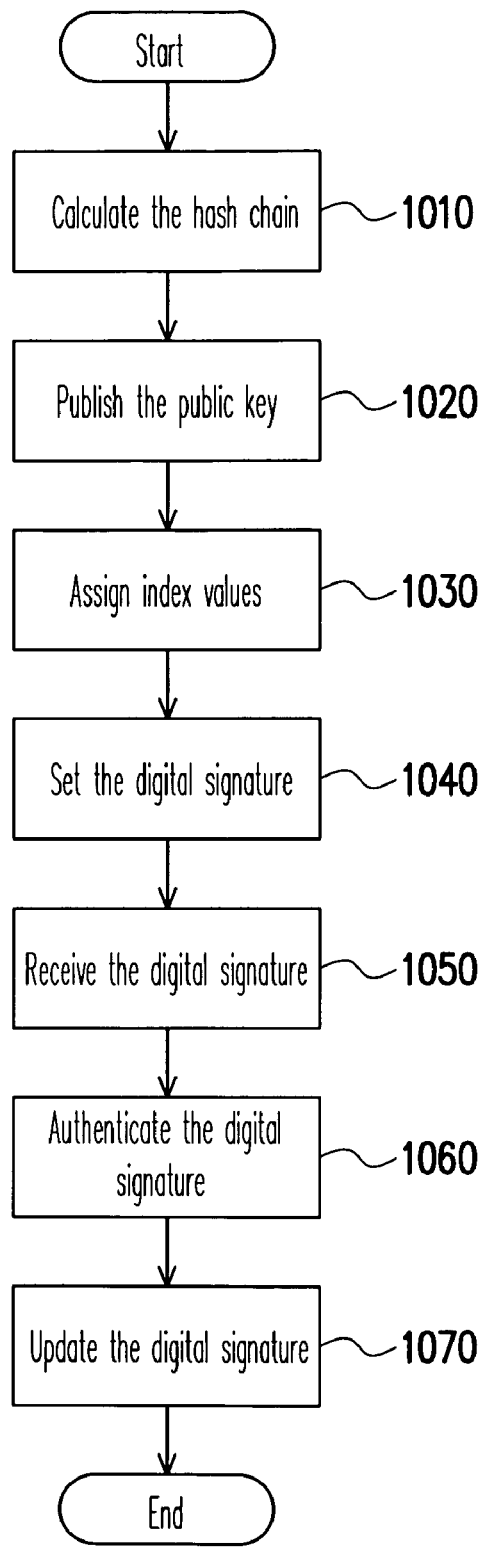
FIG. 10 is a flow chart illustrating a digital signature method according to the third embodiment of the present invention.

The digital signature method mentioned above is hash chain based, and its detail is described with referring to FIGS. 9 and 10 hereinafter. FIG. 9 is a schematic diagram of a hash chain of the present embodiment, and FIG. 10 is a flow chart illustrating a digital signature method of the present embodiment.

First, in step 1010, a hash chain is calculated according to a set of numbers $\{r_1, r_2, \ldots, r_n\}$ and an one-way hash function H. As shown in FIG. 9, the hash chain is $\{H(r_1), H(r_2), \ldots, H(r_n)\}$, $\{H^2(r_1), H^2(r_2), \ldots, H^2(r_n)\}, \ldots$, to $\{H^N(r_1), H^N(r_2), \ldots, H^N(r_n)\}$, wherein n and N are integers. In the present embodiment, the numbers $\{r_1, r_2, \ldots, r_n\}$ are randomly generated, and H is an asymmetric hash function. In other words, for an arbitrary number x, it is very hard to calculate x from H(x).

After the hash chain is calculated, $\{H^N(r_1), H^N(r_2), \ldots, H^N(r_n)\}$ is published as a public key 901 in step 1020. Here, the public key 901 is not the public key PK of FIG. 3. The public key PK of FIG. 3 is used for EAP-TLS authentication, and the public key 901 herein is for authenticating the multiple time digital signature of the network device.

Then, in step 1030, a set of index values such as $\{s_1, s_2, \ldots, s_k\}$ is assigned to each of the network devices, wherein $s_1 \sim s_k$ are the integers greater than or equal to 1 and smaller than n. In the present embodiment, the index values mentioned above are generated according to the ids of the network devices. In the entire network, the combination of the index value corresponding to each network device is not the same, and the quantity of the index values may be different. For example, if n is equal to 7 in the present invention, the combination of the index values of the first network device may be $\{1, 2, 3\}$, the combination of the index values of the second network device may be $\{4, 6, 7\}$, the combination of the index values of the third network device may be $\{1, 3, 5, 6\}$, and others applying the same.

Then, in step 1040, in the beginning of each cycle, an integer i that is smaller than N is selected, and a digital signature is configured for each network device. If the index values for one of the network devices are $\{s_1, s_2, \ldots, s_k\}$, the multiple time digital signature of the network device in this cycle is $\{H^i(r_{s_1}), H^i(r_{s_2}), \ldots, H^i(r_{s_k})\}$ In step 1050, after the network device and the client device authenticate each other with EAP-TLS, the client device receives the multiple time digital signature of the network device, and the multiple time digital signature is authenticated in step 1060. The authentication method is performing (N−i) times of hash operation on the multiple time digital signature. If the client device receives the correct multiple time digital signature $\{H^i(r_{s_1}), H^i(r_{s_2}), \ldots, H^i(r_{s_k})\}$, after (N−i) times of hash operations, $\{H^N(r_{s_1}), H^N(r_{s_2}), \ldots, H^N(r_{s_k})\}$ is obtained, that is the portion in the public key 901 corresponding to the index values $\{s_1, s_2, \ldots, s_k\}$. As long as the multiple time digital signature after the hash operations is equal to the corresponding portion of the public key, the multiple time digital signature is regarded as legitimate.

Then, in step 1070, in the beginning of the next cycle, the value i is decreased by a positive integer, and the digital signatures of all network devices are updated according to the new value of i. In the present embodiment, the system administrator is responsible for the updates. For example, in the beginning, i=N−1, and the value i is decreased by one in every cycle. If the index values for one of the network devices are $\{s_1, s_2, \ldots, s_k\}$, the multiple time digital signature of the present network device in the first cycle is $\{H^{N-1}(r_{s_1}), H^{N-1}(r_{s_2}), \ldots, H^{N-1}(r_{s_k})\}$, the multiple time digital signature of the present network device in the second cycle is $\{H^{N-2}(r_{s_1}), H^{N-2}(r_{s_2}), \ldots, H^{N-2}(r_{s_k})\}$, the multiple time digital signature of the present network device in the third cycle is $\{H^{N-3}(r_{s_1}), H^{N-3}(r_{s_2}), \ldots, H^{N-3}(r_{s_k})\}$, and others applying the same. Since the hash function H is one way, even when the multiple time digital signature of one of the network devices is embezzled in a specific cycle, the embezzled digital signature is automatically invalid in the next cycle.

In other embodiments of the present invention, the initial value of i may be smaller than N−1, and the value of i is decreased by other numbers in the beginning of each cycle. Additionally, the number to be subtracted from i in the beginning of each cycle may be different as long as the client device knows how many times of the hash operations should be performed on the digital signature in the present cycle.

In order to have the client device authenticate the multiple time digital signature, some additional information, such as the hash function H, must be further published on the bulletin board 801. For example, the client device must know the combination of the index values for each network device in order to compare the results of the hash operations. Therefore, the client device must know the combination of these index values, the id of each network device, or the method for generating the combination of the index values. The information mentioned above may be published on the bulletin board 801 or must be directly informed to the client device by the network device.

In addition to the embodiments mentioned above, the present invention further provides a system for secure authentication in a wireless network. The technical description of this system are already disclosed in details in the embodiments mentioned above, thus its detail is omitted herein.

In summary, the method and system for secure authentication in a wireless network provided by the present invention distribute an authentication mechanism to multiple network devices with the EAP-TLS protocol, so as to prevent the consequences of the failure of a single AAA server. Accordingly, the TLS master secret is only transmitted in local or even not transmitted, which alleviates the risk of transmitting the TLS master key in plain text. Moreover, it is not required to transmit the re-authentication message to the remote authentication sever, which reduces the communication cost on the periodical re-authentications.

Furthermore, a method of performing multiple times of hash function on the digital signature is applied in the method and system for secure authentication in a wireless network of the present invention, which effectively resolves the problem that the client device is not able to query the certificate status during the authentication. In addition, since the digital signature of the gateway or the access point is changed in each cycle, the system security is improved. By using the method and system for secure authentication in a wireless network mentioned above, the system administrator can quickly revoke a specific gateway or access point. Moreover, since the hash operation is much faster than the conventional asymmetric signature algorithm, the efficiency of the signature and the verification of the signature are both improved.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A method for secure authentication in a wireless network, wherein the wireless network has a plurality of network devices, and the method for secure authentication in the wireless network comprises:

using KIS to generate a plurality of sub-private keys according to a private key of a key pair;

distributing each of the sub-private keys to one of the network devices;
one of the network devices and a client device of the wireless network authenticating each other with EAP-TLS, wherein the particular network device uses the corresponding sub-private key to perform the authentication and the particular network device is a gateway or an access point; and
the particular network device and the client device generating a TLS master secret jointly.

2. The method for secure authentication in the wireless network of claim 1, wherein the particular network device is a gateway.

3. The method for secure authentication in the wireless network of claim 2, further comprising the particular network device transmitting the TLS master secret to an access point used by the client device.

4. The method for secure authentication in the wireless network of claim 1, wherein the particular network device is an access point.

5. A method for secure authentication in a wireless network, comprising:
a network device and a client device of a wireless network authenticating each other with EAP-TLS, wherein the network device is a gateway or an access point; and
the network device and the client device generating a TLS master secret jointly;
calculating $\{H(r_1), H(r_2), \ldots, H(r_n)\}$, $\{H^2(r_1), H^2(r_2), \ldots, H^2(r_n)\}, \ldots,$ to $\{H^N(r_1), H^N(r_2), \ldots, H^N(r_n)\}$ according to a set of numbers $\{r_1, r_2, \ldots, r_n\}$ and an asymmetric one-way hash function H, wherein n and N are integers;
publishing $\{H^N(r_1), H^N(r_2), \ldots, H^N(r_n)\}$;
assigning a set of index values $\{s_1, s_2, \ldots, s_k\}$ to the network device, wherein $\{s_1, s_2, \ldots, s_k\} \subseteq \{1, 2, \ldots, n\}$;
in the beginning of one cycle, using $\{H^i(r_{s_1}), H^i(r_{s_2}), \ldots, H^i(r_{s_k})\}$ as a multiple time digital signature of the network device, wherein i is an integer smaller than N;
after the network device and the client device authenticating each other with EAP-TLS, the client device receiving the multiple time digital signature of the network device;
if, after performing (N−i) times of hash operation on the multiple time digital signature of the network device with the asymmetric one-way hash function H, $\{H^N(r_{s_1}), H^N(r_{s_2}), \ldots, H^N(r_{s_k})\}$ is obtained, the multiple time digital signature is determined as legitimate; and
in the beginning of a next cycle, decreasing the value of i by a positive integer and updating the multiple time digital signature of the network device according to the new value of i.

6. The method for secure authentication in the wireless network of claim 5, wherein the set of numbers $\{r_1, r_2, \ldots, r_n\}$ is generated randomly.

7. The method for secure authentication in the wireless network of claim 5, wherein the set of index values $\{s_1, s_2, \ldots, s_k\}$ is generated according to an identification (id) code of the network device.

8. The method for secure authentication in the wireless network of claim 5, wherein i is equal to N−1, and i is decreased by one in the beginning of the next cycle.

9. The method for secure authentication in the wireless network of claim 6, wherein if the wireless network has a plurality of network devices, the combination of the index values corresponding to each of the network devices is not the same.

10. A system for secure authentication in a wireless network, comprising:
a client device; and
a plurality of network devices, wherein one of the network devices and the client device authenticate each other with EAP-TLS, and generate a TLS master secret jointly after the authentication, the particular network device uses one of a plurality of sub-private keys to perform the authentication, the sub-private keys are generated by using KIS according to a private key of a key pair and distributed to the network devices, moreover the particular network device is a gateway or an access point.

11. The system for secure authentication in the wireless network of claim 10, wherein the particular network device is a gateway.

12. The system for secure authentication in the wireless network of claim 11, wherein the particular network device transmits the TLS master secret to an access point used by the client device.

13. The system for secure authentication in the wireless network of claim 10, wherein the particular network device is an access point.

14. A system for secure authentication in a wireless network, comprising:
a client device; and
a network device, wherein the network device and the client device authenticate each other with EAP-TLS, and generate a TLS master secret jointly after the authentication, moreover the network device is a gateway or an access point, after the client device and the network device authenticate each other with EAP-TLS, the client device receives a multiple time digital signature of the network device, meanwhile if $\{H^N(r_{s_1}), H^N(r_{s_2}), \ldots, H^N(r_{s_k})\}$ is obtained after performing (N−i) times of hash operation on the multiple time digital signature with an asymmetric one-way hash function H, the client device determines the multiple time digital signature in the present cycle is legitimate, and the multiple time digital signature of the network device is updated in the beginning of the next cycle; wherein
n and N are integers, and i is an integer smaller than N;
$\{H^N(r_{s_1}), H^N(r_{s_2}), \ldots, H^N(r_{s_k})\}$ is one part of a hash chain, and the hash chain comprises $\{H(r_1), H(r_2), \ldots, H(r_n)\}, \{H^2(r_1), H^2(r_2), \ldots, H^2(r_n)\}, \ldots,$ to $\{H^N(r_1), H^N(r_2), \ldots, H^N(r_n)\}$, the hash chain is calculated according to a set of numbers $\{r_1, r_2, \ldots, r_n\}$ and an asymmetric one-way hash function H, wherein $\{H^N(r_1), H^N(r_2), \ldots, H^N(r_n)\}$ is published as a public key;
$\{s1, s2, \ldots, sk\}$ is a set of index values that is assigned to the network device, and $\{s_1, s_2, \ldots, sk\} \subseteq \{1, 2, \ldots, n\}$;
in the beginning of the present cycle, the multiple time digital signature of the network device is configured as $\{H^i(r_{s_1}), H^i(r_{s_2}), \ldots, H^i(r_{s_k})\}$; and
in the beginning of the next cycle, the value of i is decreased by a positive integer, and then the multiple time digital signature $\{H^i(r_{s_1}), H^i(r_{s_2}), \ldots, H^i(r_{s_k})\}$ of the network device is updated according to the new value of i.

15. The system for secure authentication in the wireless network of claim 14, wherein the set of numbers $\{r_1, r_2, \ldots, r_n\}$ is generated randomly.

16. The system for secure authentication in the wireless network of claim 14, wherein the set of index values $\{s_1, s_2, \ldots, s_k\}$ is generated according to an identification (id) code of the network device.

17. The system for secure authentication in the wireless network of claim 14, wherein i is equal to N−1, and i is decreased by one in the beginning of the next cycle.

18. The system for secure authentication in the wireless network of claim 14, wherein if the wireless network has a plurality of network devices, the combination of the index values corresponding to each of the network devices is not the same.

* * * * *